United States Patent
Kim et al.

(10) Patent No.: US 10,135,637 B2
(45) Date of Patent: Nov. 20, 2018

(54) METHOD AND APPARATUS FOR TRANSMITTING SIGNAL IN COMMUNICATION SYSTEM

(71) Applicants: Samsung Electronics Co., Ltd, Gyeonggi-do (KR); Korea Advanced Institute of Science and Technology, Daejeon (KR)

(72) Inventors: Jae-Won Kim, Seoul (KR); Hyun-Cheol Park, Daejeon (KR); Eun-Hye Heo, Gyeonggi-do (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 70 days.

(21) Appl. No.: 15/368,534

(22) Filed: Dec. 2, 2016

(65) Prior Publication Data

US 2017/0164370 A1    Jun. 8, 2017

(30) Foreign Application Priority Data

Dec. 2, 2015    (KR) ........................ 10-2015-0170901

(51) Int. Cl.
*H04L 25/00* (2006.01)

(52) U.S. Cl.
CPC .................................... *H04L 25/00* (2013.01)

(58) Field of Classification Search
None
See application file for complete search history.

(56) References Cited

U.S. PATENT DOCUMENTS

| | | | |
|---|---|---|---|
| 2012/0002740 A1* | 1/2012 | Han | H04L 5/0048 375/260 |
| 2014/0286255 A1 | 9/2014 | Nam et al. | |
| 2017/0041932 A1* | 2/2017 | Chae | H04W 72/04 |

OTHER PUBLICATIONS

Hosein Nikopour, et al., "Sparse Code Multiple Access", 2013 IEEE 24th International Symposium on Personal, Indoor and Mobile Radio Communication: Fundamentals and PHY Track, Sep. 9, 2013, 5 pages.

* cited by examiner

*Primary Examiner* — Diane L Lo (57) ABSTRACT

A method for transmitting a signal in a communication system includes transmitting a signal using pre-generated matrix, wherein the pre-generated matrix is generated by repeating one matrix including zero elements by a predetermined number of times and a particular sequence is allocated to non-zero elements included in the pre-generated matrix. An apparatus for receiving a signal in a communication system includes at least one processor configured to make a control to receive a transmitted signal based on a pre-generated matrix and to receive the signal, wherein the pre-generated matrix is generated by repeating one matrix including zero elements by a predetermined number of times and a particular sequence is allocated to non-zero elements included in the pre-generated matrix.

20 Claims, 10 Drawing Sheets

$$F = \begin{bmatrix} 1 & 1 & 0 & 0 \\ 1 & 0 & 1 & 0 \\ 1 & 0 & 0 & 1 \\ 0 & 1 & 1 & 0 \\ 0 & 1 & 0 & 1 \\ 0 & 0 & 1 & 1 \end{bmatrix} \begin{matrix} \leftarrow j_1 \\ \leftarrow j_2 \\ \leftarrow j_3 \\ \leftarrow j_4 \\ \leftarrow j_5 \\ \leftarrow j_6 \end{matrix}$$

with columns $k_1, k_2, k_3, k_4$

[EMBODIMENT] K=4, N=2, J=6

◄──────────── L = 12 tones ────────────►

FIG.4

$$\bar{x}^{ZC} = [\, X_1^{ZC} \; X_2^{ZC} \; X_3^{ZC} \,]$$

↓

| $X_1^{ZC}$ | $X_1^{ZC}$ | 0 | 0 | $X_2^{ZC}$ | $X_2^{ZC}$ | 0 | 0 | $X_3^{ZC}$ | $X_3^{ZC}$ | 0 | 0 |
| $X_3^{ZC}$ | 0 | $X_1^{ZC}$ | 0 | $X_1^{ZC}$ | 0 | $X_2^{ZC}$ | 0 | $X_2^{ZC}$ | 0 | $X_3^{ZC}$ | 0 |
| $X_2^{ZC}$ | 0 | 0 | $X_1^{ZC}$ | $X_3^{ZC}$ | 0 | 0 | $X_2^{ZC}$ | $X_1^{ZC}$ | 0 | 0 | $X_3^{ZC}$ |
| 0 | $X_3^{ZC}$ | $X_2^{ZC}$ | 0 | 0 | $X_1^{ZC}$ | $X_3^{ZC}$ | 0 | 0 | $X_2^{ZC}$ | $X_1^{ZC}$ | 0 |
| 0 | $X_2^{ZC}$ | 0 | $X_3^{ZC}$ | 0 | $X_3^{ZC}$ | 0 | $X_1^{ZC}$ | 0 | $X_1^{ZC}$ | 0 | $X_2^{ZC}$ |
| 0 | 0 | $X_3^{ZC}$ | $X_2^{ZC}$ | 0 | 0 | $X_1^{ZC}$ | $X_3^{ZC}$ | 0 | 0 | $X_2^{ZC}$ | $X_1^{ZC}$ |

L = 12 tones

FIG.5

FIG. 6 for n = 1 : $K$
   $x^{ZC} = \bar{x}^{ZC}$
   for d = 1 : $d$
     · i = $\Omega_n^I(i)$
     · ALLOCATE ZC SIGNAL $X^{ZC}$ TO $I_i^n$ LOCATION OF EXPANDED GRAPH MATRIX
        $I_i^n = [(i,n)\ (i,n+K)\ (i,n+2K)\ \cdots\ (i,n+(Q-1)K)]$
     · $x^{ZC} = dth\ cyclic\ shift\ (\bar{x}^{ZC})$
   end
end \*$\Omega_n$:VECTOR INDICATING INDEXES OF UES USING
$N^{TH}$ TONE IN INCREASING ORDER

◆ WHEN TRANSMISSION POWER IS FIXED TO L

|  | CONVENTIONAL DMRS | PROPOSED DMRS |
|---|---|---|
| (a) TRANSMISSION POWER PER TONE | 1 INCREASE → | $\frac{K}{N}$ |
| (b) DE-SPREADING GAIN | $\frac{noise}{L}$ = | $\frac{noise}{\left(L \times \frac{K}{N}\right) \times \frac{K}{N}}$ |

METHOD AND APPARATUS FOR TRANSMITTING SIGNAL IN COMMUNICATION SYSTEM

CROSS-REFERENCE TO RELATED APPLICATION AND CLAIM OF PRIORITY

The present application is related to and claims priority under 35 U.S.C. § 119(a) to Korean Application Serial No. 10-2015-0170901, which was filed in the Korean Intellectual Property Office on Dec. 2, 2015, the entire content of which is hereby incorporated by reference.

TECHNICAL FIELD

The present disclosure relates to a method and an apparatus for transmitting a signal for channel estimation in a communication system.

BACKGROUND

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive Multi-Input Multi-Output (MIMO), Full Dimensional MIMO (FD-MIMO), array antenna, analog beam-forming, and large scale antenna are discussed to mitigate propagation path loss in the mmWave band and increase propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation have been developed to improve the system network in the 5G communication system.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

The SCMA has been spotlighted as a multi-access technology that can support a plurality of terminals in an Internet of Things environment by sharing and using time-frequency resources. However, results so far have been achieved under an assumption of accurate synchronization and accurate channel estimation, and there is a lack of research on a channel estimation and synchronization method in the SCMA-based communication system. The SCMA-based communication system uses $N_{data}$ Resources Elements (REs) based on one Orthogonal Frequency Division Multiplexing (OFDM) symbol in data transmission, but should use $N_{pilot}$ REs based on one OFDM symbol as reference signals when using Demodulation Reference Signals (DMRSs) for channel estimation. $N_{data}$ and $N_{pilot}$ are determined as shown in equation (1) below.

$$N_{data} = L \times \frac{N}{K}, N_{pilot} = L \quad (1)$$

In equation (1), L corresponds to a length of a subcarrier used for data transmission in a frequency band, and it is assumed that symbol power per RE is 1. In an SCMA-based communication system, the number of REs used as pilots in the channel estimation using the conventional DMRS increases $$\frac{K}{N}$$

times compared to the number of REs required for data transmission. Further, in a frequency selective fading channel that changes according to a frequency, the conventional DMRS does not maintain orthogonality and thus a channel estimation performance deteriorates.

Accordingly, a method of generating a DMRS which allows efficient channel estimation in the SCMA-based communication system and transmitting/receiving a signal is required.

SUMMARY

To address the above-discussed deficiencies, it is a primary object to provide a method and an apparatus for generating a signal for channel estimation and transmitting/receiving the generated signal in a communication system.

Further, an embodiment of the present disclosure provides a method and an apparatus for generating a signal having a sparse code property and transmitting/receiving the generated signal in a communication system.

In addition, an embodiment of the present disclosure provides a method and an apparatus for generating signals that maintain orthogonality in a frequency selective fading channel and transmitting/receiving the generated signals in a communication system.

In accordance with an aspect of the present disclosure, a method of transmitting a signal in a communication system is provided. The method includes transmitting a signal based on a pre-generated matrix, wherein the pre-generated matrix is generated by repeating one matrix including zero elements by a predetermined number of times and a particular sequence is allocated to non-zero elements included in the pre-generated matrix.

In accordance with another aspect of the present disclosure, a method of receiving a signal in a communication system is provided. The method includes receiving a transmitted signal based on a pre-generated matrix, wherein the pre-generated matrix is generated by repeating one matrix including zero elements by a predetermined number of times and a particular sequence is allocated to non-zero elements included in the pre-generated matrix.

In accordance with another aspect of the present disclosure, an apparatus for transmitting a signal in a communication system is provided. The apparatus includes at least one processor configured to make a control to transmit a signal based on a pre-generated matrix and to transmit the signal, wherein the pre-generated matrix is generated by repeating one matrix including zero elements by a predetermined number of times and a particular sequence is allocated to non-zero elements included in the pre-generated matrix.

In accordance with another aspect of the present disclosure, an apparatus for receiving a signal in a communication system is provided. The apparatus includes at least one processor configured to make a control to receive a transmitted signal based on a pre-generated matrix and to receive the signal, wherein the pre-generated matrix is generated by repeating one matrix including zero elements by a predetermined number of times and a particular sequence is allocated to non-zero elements included in the pre-generated matrix.

Other aspects, gains, and core features of the present disclosure are processed along with additional drawings, and they are apparent to those skilled in the art from the following detailed description including exemplary embodiments of the present disclosure.

Prior to the detailed description of the present disclosure, it is effective to configure the definitions of specific words and phrases used throughout this patent document. The terms "include", "comprise", and derivatives thereof may mean inclusion without limitation, the term "or" may have an inclusive meaning and means "and/or", the phrases "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of, the term "controller" may mean any device, system, or a part thereof that controls at least one operation, and such a device may be implemented in hardware, firmware, or software, or some combinations of at least two of the same. It should be noted that the functionality associated with any particular controller may be centralized or distributed, whether locally or remotely. Definitions for certain words and phrases are provided throughout this patent document, those skilled in the art should understand that in many, if not most instances, such definitions apply to prior, as well as future uses of such defined words and phrases.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

The above and other aspects, features, and advantages of the present disclosure will be more apparent from the following detailed description taken in conjunction with the accompanying drawings, in which.

It should be noted that similar reference numerals are used to indicate identical or similar elements, features, and structures through the above figures.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following detailed described that refers to the accompanying drawings help in comprehensively understanding various embodiments of the present disclosure defined by the claims and the equivalents thereof. Although the following detailed description includes various specific concrete explanations to assist with understanding, they are considered to be only examples. Accordingly, those skilled in the art may recognize that various modifications and changes of the various embodiments described herein can be made without departing from the range and scope of the present disclosure. Further, descriptions of the known functions and elements can be omitted for clarity and brevity.

The terms and words used in the following detailed description and the claims are not limited to literal meanings, and are simply used for helping obtain a clear and consistent understanding of the present disclosure of the disclosure. Therefore, it should be apparent to those skilled in the art that the following description of various embodiments of the present disclosure is provided for illustrative purposes only, and is not intended to limit the present disclosure that is defined by the appended claims and equivalents thereof.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as commonly understood by those of skill in the art to which the present disclosure pertains. Such terms as those defined in a generally used dictionary are to be interpreted to have the meaning equal to the contextual meaning in the relevant field of art.

Figure 1:
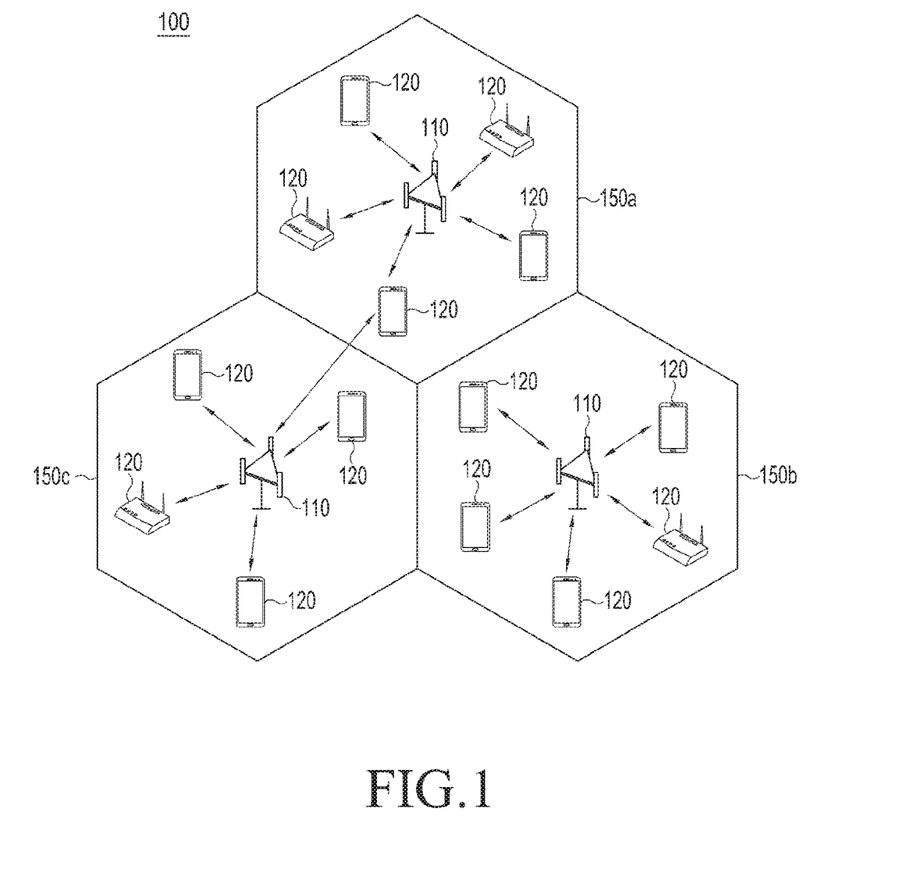
FIG. 1 illustrates a communication system to which an embodiment of the present disclosure is applied.

FIG. 1 illustrates a communication system to which an embodiment of the present disclosure is applied.

Referring to FIG. 1, a communication system 100 includes at least one evolved Node B (eNB) 110 that provides various communication services such as voice and packet data. Each eNB 110 provides a communication service to a particular cell 150a, 150b, or 150c. Further, one eNB 110 can handle a plurality of cells. According to an embodiment of the present disclosure, the eNB 110 can refer to a transmission/reception entity that shares information and control information with a User Equipment (UE) for cellular communication, and can be called another term such as a base station, a Base Transceiver System (BTS), an access point, a femto eNB, a home nodeB, or a relay node. Further, the cell can include all of various coverage areas such as a mega cell, a macro cell, a micro cell, a pico cell, and a femto cell.

At least one UE 120 can be fixed or moved, and can be called another term such as a mobile state, a mobile terminal, a user terminal, a subscriber station, a wireless device, a wireless modem, or a wireless device.

In the communication system 100, it is required to estimate an uplink or downlink channel for data transmission/reception, system synchronization acquisition, and channel information feedback. A process of reconstructing a transmitted signal by compensating for distortion of a signal generated by a rapid change of a channel environment is referred to as channel estimation. Further, it is required to measure a channel state for a cell to which the UE 120 pertains or another cell. In general, for channel estimation or channel state measurement, a Reference Signal (RS) known between the UE 120 and the eNB 110 can be used. The RS can be allocated to all subcarriers or allocated between subcarriers that transmit data. In particular, the RS used in uplink for channel estimation in the communication system can include a DMRS, and, since channel information of a frequency band corresponding to Physical Uplink Shared Channel (PUSCH)/Physical Uplink Control Channel (PUCCH) transmission is only required, the DMRS is transmitted to a length of the corresponding frequency band. Hereinafter, although it is assumed that the RS is the DMRS in an embodiment of the present disclosure, the embodiment of the present disclosure can be applied to another RS using the same structure or sequence as that of the DMRS.

The DMRS can be generally transmitted based on a sequence. The sequence can be a sequence having an excellent correlation property and the sequence having the excellent correlation property can be, for example, a Zadoff-Chu (ZC) sequence. Accordingly, the DMRS can be transmitted based on the ZC sequence as shown in equation (2).

$$X_k^{ZC} = \begin{cases} \exp\left(-j\frac{u\pi k^2}{M_{zc}}\right) \text{ for } M_{zc} \text{ interger even} \\ \exp\left(-j\frac{u\pi k(k+1)}{M_{zc}}\right) \text{ for } M_{zc} \text{ interger odd} \end{cases} 0 \le k < M_{zc} \quad (2)$$

The ZC sequence of a baseband can have a property that is completely orthogonal to the ZC sequence performing cyclic shift.

For example, in the communication system, the UE or the eNB can generate a new sequence by performing a phase shift on the ZC sequence of the baseband by $\propto$ on the frequency. When spatial multiplexing is used for one UE or in order to provide orthogonal RSs to UEs having received the same resources within one cell, the phase shift of the baseband ZC sequence is applied. In order to use the orthogonal RSs in the communication system, received signals should be timing aligned and a channel frequency response should be consistently maintained within the frequency band in which the DMRS is transmitted.

Accordingly, an embodiment of the present disclosure proposes a scheme for generating an expanded DMRS based on a sparse code structure of data to efficiently perform channel estimation in an SCMA-based communication system. Further, the DMRS generated as described in the embodiment of the present disclosure is transmitted to a reception device through a transmission device. Since a method of transmitting/receiving the DMRS to/from the reception device through the transmission device is the same as a method of transmitting/receiving a signal in the conventional communication technology, the method of transmitting/receiving the signal will be not described below in detail. That is, a method of generating the DMRS by a signal generation device according to an embodiment of the present disclosure will be described below in detail.

Figure 2:
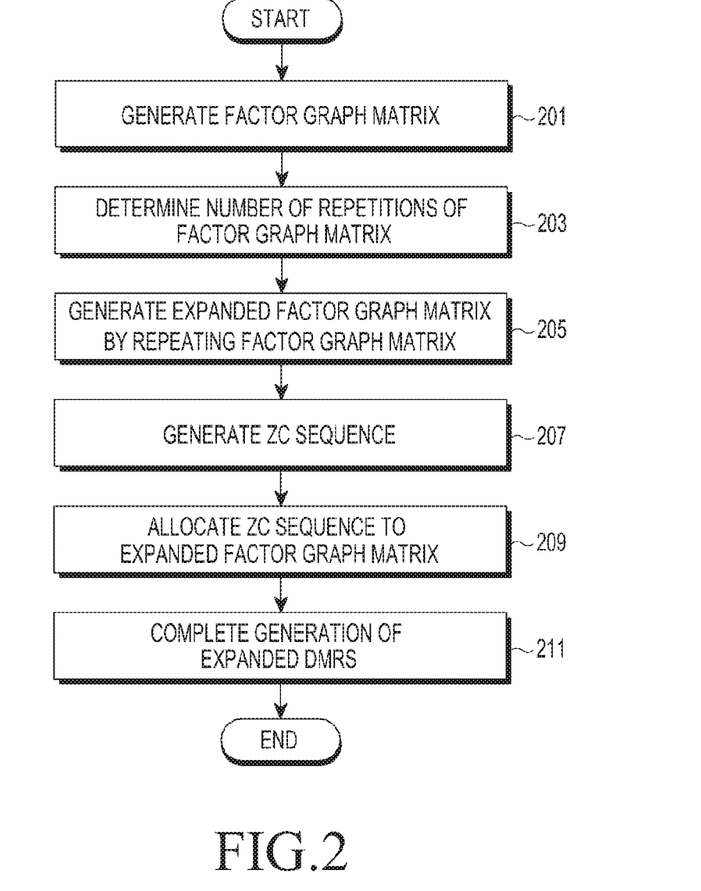
FIG. 2 illustrates a method of generating a signal in a communication system according to an embodiment of the present disclosure.

FIG. 2 illustrates a method of generating a signal in a communication system according to an embodiment of the present disclosure. The method of generating the signal in the communication system according to the embodiment of the present disclosure can be performed by a device that generates a signal included in each of at least one eNB 110 and the UE 120 included in the communication system. Hereinafter, for convenience of the description, the device that generates the signal will be defined as described as a signal generation device.

Referring to FIG. 2, the signal generation device generates one factor graph matrix according to a parameter used for channel estimation in an SCMA-based communication system in step 201. The parameter can be received from another entity or can be already stored inside. Further, the parameter includes a code length (K) used in the SCMA-based communication system, the number (N) of non-zero symbols, and the maximum number (J) of accessible UEs in the SCMA-based communication system. At this time, J can be determined according to a relation between K and N.

Figure 3:
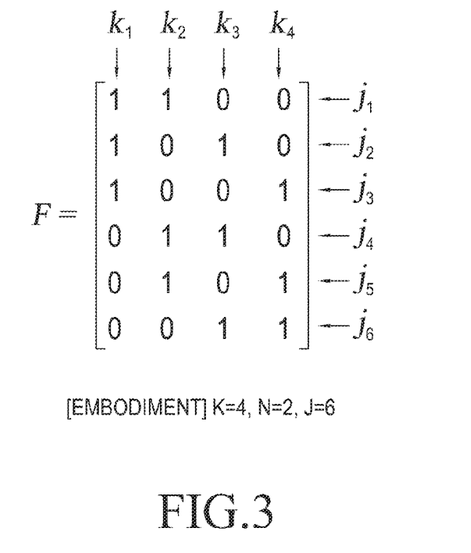
FIG. 3 illustrates an example of a factor graph matrix generated by a signal generation device according to an embodiment of the present disclosure.

FIG. 3 illustrates an example of the factor graph matrix generated by the signal generation device according to an embodiment of the present disclosure, and the signal generation device can generate the factor graph matrix illustrated in FIG. 3 when the parameters are under the conditions such as K=4, N=2, and J=6. The number of columns of the factor graph matrix corresponds to the code length, and the number of rows of the factor graph matrix corresponds to the maximum number of accessible UEs.

Next, the signal generation device determines the number Q of repetitions by which the generated on factor graph matrix is repeated to generate the expanded DMRS having the sparse code structure in step 203. The number Q of repetitions should be determined to meet the condition of equation (3) below.

$$d_f \leq Q \Rightarrow (J \times N)/K \leq Q \quad (3)$$

In equation (3), df denotes the number of signals that are simultaneously transmitted and received in one tone included in the factor graph matrix. The signal can be a signal transmitted/received by the UE. The one tone corresponds to one element included in the row of the factor graph matrix.

Thereafter, the signal generation device generates an expanded factor graph matrix having an overall length L=Q×K (tones) by repeating the one factor graph matrix by Q times in step 205.

Figure 4:
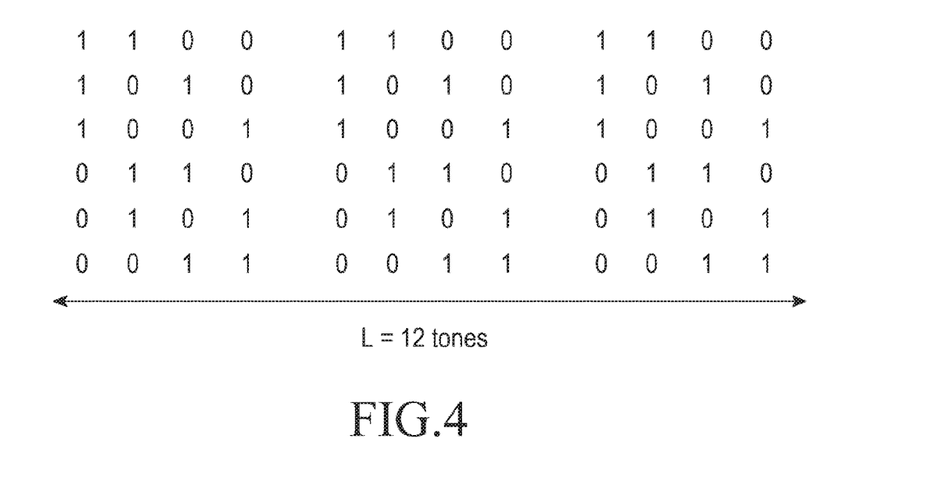
FIG. 4 illustrates an example of an expanded factor graph matrix generated by a signal generation device according to an embodiment of the present disclosure.

FIG. 4 illustrates an example of the expanded factor graph matrix generated by the signal generation device according to an embodiment of the present disclosure, and the signal generation device can generate the expanded factor graph matrix illustrated in FIG. 4 when parameters are under the conditions such as K=4, N=2, J=6, Q=3, and L=12.

Further, the signal generation device generates the ZC sequence having a length Q to be applied to the expanded factor graph matrix as shown in equation (4) below.

$$\overline{X}^{ZC} = [X_0^{ZC} \ X_1^{ZC} \ \ldots \ X_{Q-1}^{ZC}], \quad (4)$$

$$X_k^{ZC} = \begin{cases} \exp\left(-j\frac{u\pi k^2}{M_{zc}}\right) \text{ for } M_{zc}\text{interger even} \\ \exp\left(-j\frac{u\pi k(k+1)}{M_{zc}}\right) \text{ for } M_{zc}\text{interger odd} \end{cases} 0 \leq k < M_{zc}$$

In equation (4), the length Q is set as the same value as the number Q of repetitions of the factor graph matrix.

The signal generation device allocates the generated ZC sequence in consideration of zero elements in the expanded factor graph matrix in order to maintain orthogonality of the DMRS having a length L between UEs in step 209. At this time, one of a plurality of elements included in the ZC sequence is allocated to each of the non-zero elements included in one column of the expanded factor graph matrix, and an element cyclic shifted from the one element included in the ZC sequence is allocated to each of the non-zero elements included in one column of the pre-generated matrix and a non-zero element located at a predetermined column interval. Accordingly, the orthogonality can be maintained between the non-zero elements included in the expanded factor graph matrix. Therefore, the signal generation device can generate the DMRS having the length L in the sparse code structure in step 211.

Figure 5:
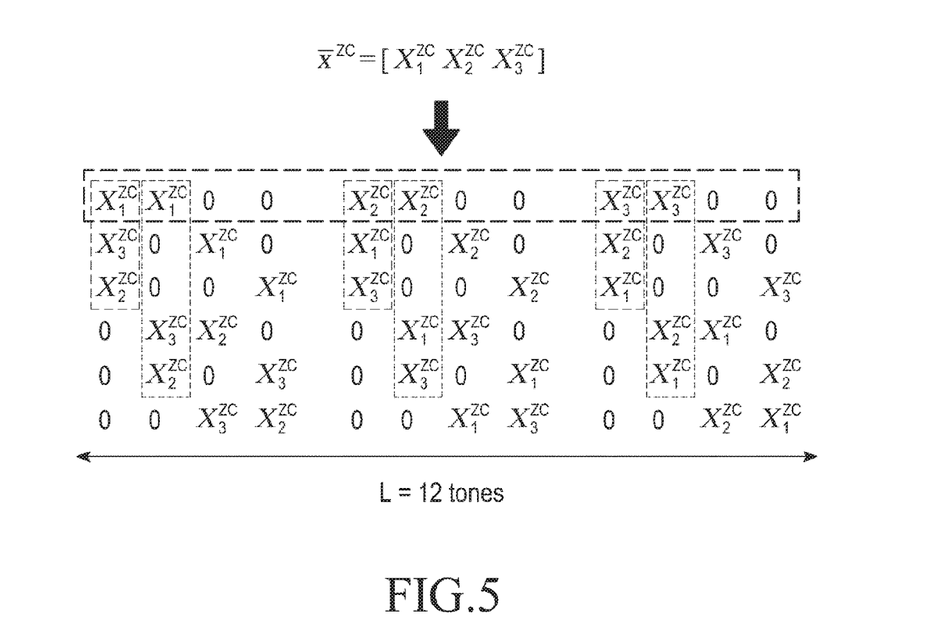
FIGS. 5 and 6 illustrate examples in which a signal generation device allocates a ZC sequence to an expanded factor graph matrix according to an embodiment of the present disclosure.
Figure 6:
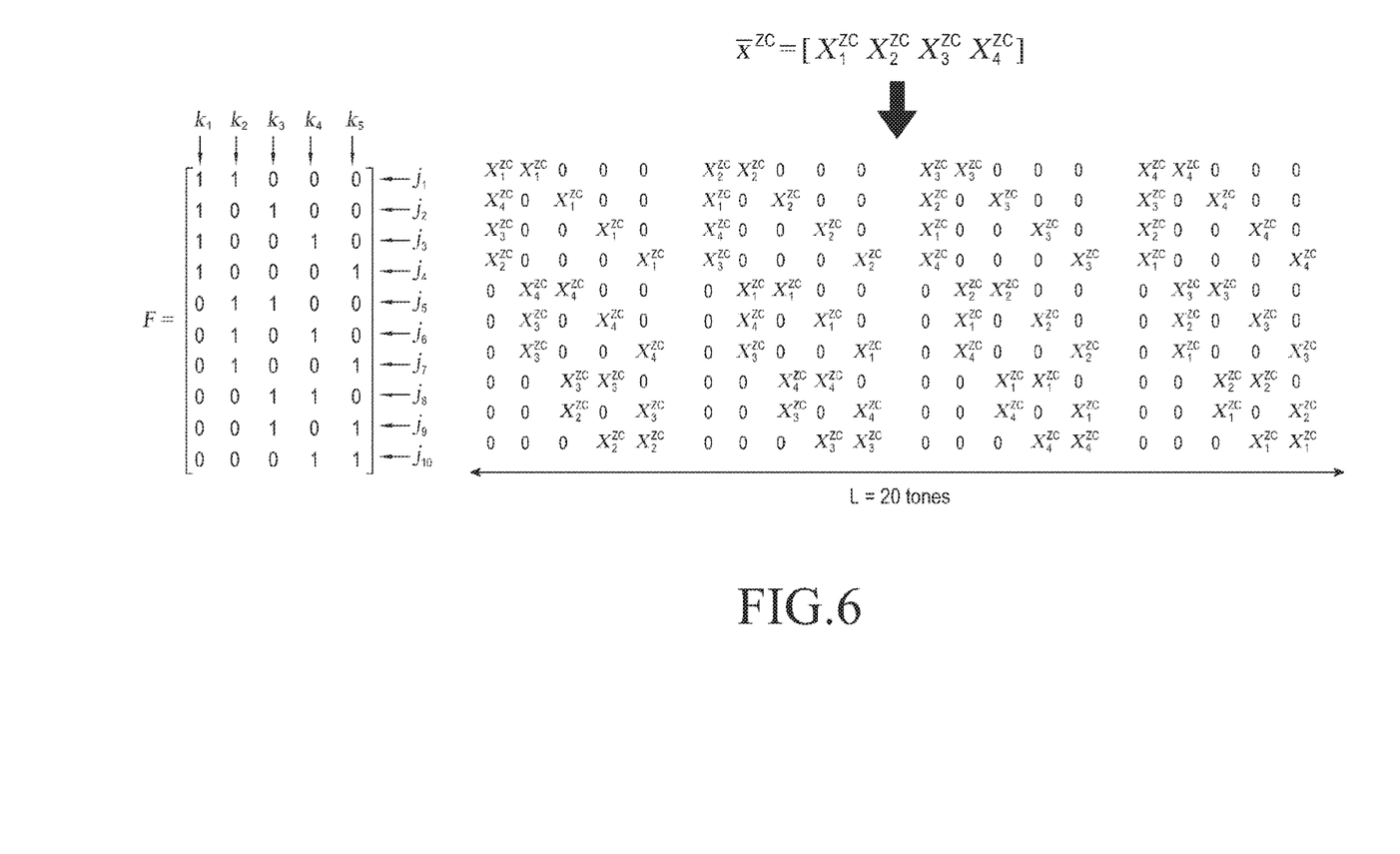

For example, FIGS. 5 and 6 illustrate examples in which the signal generation device allocates the ZC sequence to the expanded factor graph matrix according to an embodiment of the present disclosure. The signal generation device can allocate the ZC sequence to the expanded factor graph matrix in consideration of zero elements included in the expanded factor graph matrix when parameters are under the conditions such as K=4, N=2, J=6, Q=3, and L=12 as illustrated in FIG. 5. Further, the signal generation device can allocate the ZC sequence to the expanded factor graph matrix in consideration of zero elements included in the expanded factor graph matrix when parameters are under the conditions such as K=5, N=2, J=10, Q=4, and L=20 as illustrated in FIG. 6.

Accordingly, as illustrated in FIGS. 5 and 6, it can be noted that one of a plurality of elements included in the ZC sequence is allocated to each of the non-zero elements included in one column of the expanded factor graph matrix and an element cyclic shifted from the one element is allocated to each of the non-zero elements included in one column of the expanded factor graph matrix and a non-zero element located at a predetermined column interval. The predetermined column interval is, for example, 4 in FIGS. 5 and 6.

Accordingly, the corresponding DMRS can be allocated to each UE based on the expanded DRMS having the sparse code structure from the signal generation method described in FIGS. 2 to 6. That is, in the expanded DMRSs having the sparse code structure according to an embodiment of the present disclosure, DMRSs can be allocated to each of the plurality of UEs according to each tone having the same overlapping pattern. Accordingly, the expanded DMRS having the sparse code structure is generated by performing cyclic shift on the baseband ZC sequence according to an embodiment of the present disclosure, tones having the same overlapping pattern can maintain orthogonality and thus the orthogonality can be maintained in entire DMRSs. Further, the expanded DMRS having the sparse code structure generated according to the embodiment of the present disclosure can be applied to frequency and time resources.

Figure 7:
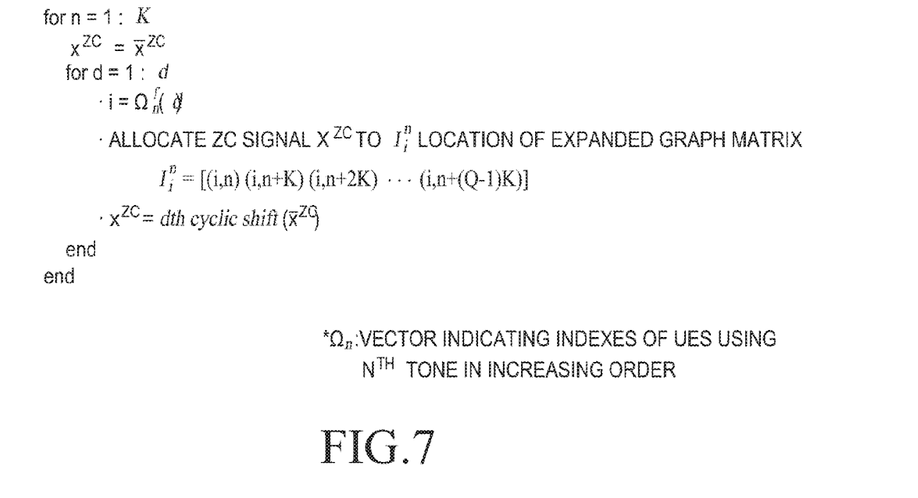
FIG. 7 illustrates an example of an algorithm that generates a signal in a communication system according to an embodiment of the present disclosure.

The signal generation method according to the embodiment of the present disclosure described based on FIGS. 2 to 6 can be implemented by an algorithm illustrated in FIG. 7. FIG. 7 illustrates an example of an algorithm that generates a signal in a communication system according to an embodiment of the present disclosure and corresponds to an algorithm that generates an expanded DMRS which maintains orthogonality between UEs by using the ZC sequence.

The method of generating the signal for channel estimation in the communication system according to the embodiment of the present disclosure has been described in FIGS. 2 to 7, and an internal structure of a channel estimation device that generates the signal for channel estimation in the communication system according to an embodiment of the present disclosure will be described with reference to FIG. 8.

Figure 8:
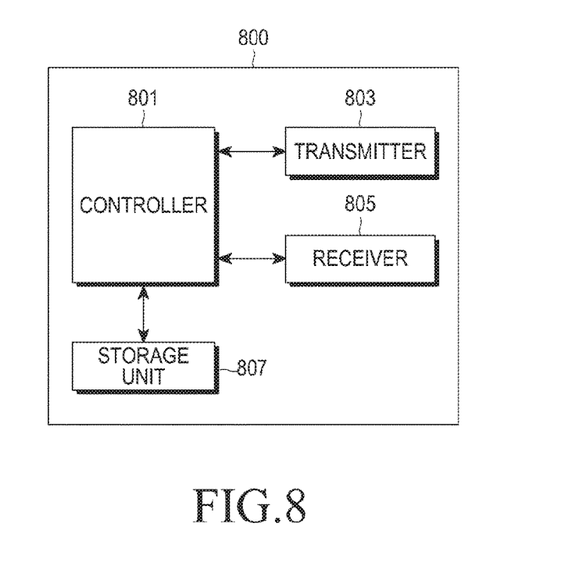
FIG. 8 illustrates an internal configuration of a signal generation device that performs an operation of generating a signal in a communication system according to an embodiment of the present disclosure.

FIG. 8 illustrates an internal configuration of the signal generation device that performs an operation of generating a signal in a communication system according to an embodiment of the present disclosure. The signal generation device can be included in each of at least one eNB 110 and the UE 120.

Referring to FIG. 8, a signal generation device 800 includes a controller 801, a transmitter 803, a receiver 805, and a storage unit 807.

The controller 801 controls the general operation of the signal generation device 800 and, in particular, control an operation related to the operation of generating the signal according to an embodiment of the present disclosure. Since the operation related to the operation of generating the signal according to an embodiment of the present disclosure is the same as the description made through FIGS. 2 to 6, a detailed description thereof will be omitted.

The transmitter 803 receives various signals and various messages from other entities included in the communication system according to a control of the controller 801. Since the various signals and the various messages received by the transmitter 803 are the same as those described in FIGS. 2 to 6, a detailed description thereof will be omitted herein.

The receiver 805 receives various signals and various messages from other entities included in the communication system according to a control of the controller 801. Since the various signals and the various messages received by the receiver 805 are the same as those described in FIGS. 2 to 6, a detailed description thereof will be omitted herein.

The storage unit 807 stores a program and various pieces of data associated with the operation related to the operation of generating the signal according to an embodiment of the present disclosure that is performed by the signal generation device 800 according to a control of the controller 801. Further, the storage unit 807 stores various signals and various messages received from the other entities by the receiver 805.

Meanwhile, although FIG. 8 illustrates a case where the signal generation device 800 includes separate units such as the controller 801, the transmitter 803, the receiver 805, and the storage unit 807, the signal generation device 800 can be implemented to include a combination of two or more of the controller 801, the transmitter 803, the receiver 805, and the storage unit 807. Further, the signal generation device 800 can be implemented as one processor.

When the signal generation device according to an embodiment of the present disclosure performs the channel estimation by using the expanded DMRS having the sparse code structure, calculation complexity of the channel estimation and a Mean Square Error (MSE) of the channel estimation can be reduced compared to a case where the channel estimation is performed using the DMRS generated by the conventional art.

When the channel estimation is performed through a de-spreading method using the DMRS having the length L generated by the conventional art, complexity for a multiplication calculation is L. However, when the channel estimation is performed using the expanded DMRS having the sparse code structure generated according to the embodiment of the present disclosure, non-zero elements decrease to be L×(N/K) and thus complexity for the multiplication calculation decreases K/N times. For example, in a case of K=4, N=2, and J=6, when the channel estimation is performed using the expanded DMRS having the sparse code structure of a data length L=12, it can be noted that complexity for the multiplication calculation decreases two times compared to the conventional art.

Figure 9A:
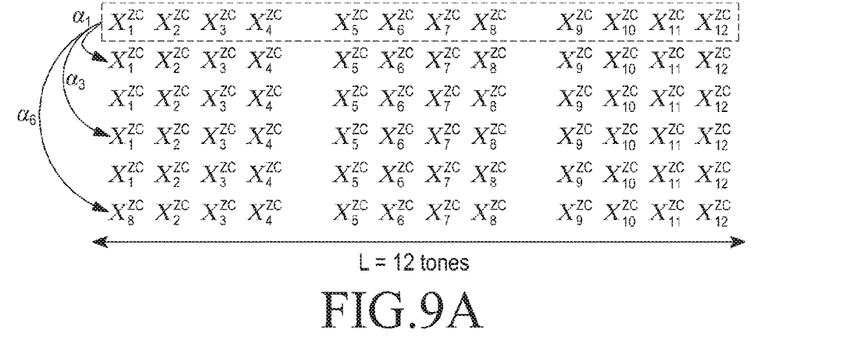
FIGS. 9A, 9B, 9C and 10 illustrate an example of a comparison between channel estimation results using DMRSs according to the conventional art and the embodiment of the present disclosure.
Figure 9B:
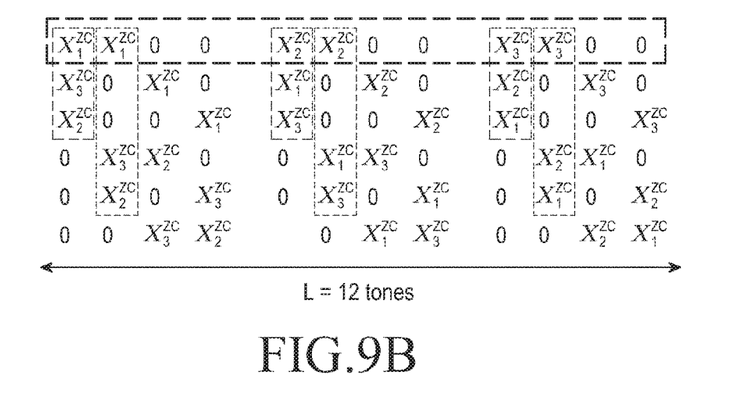
Figure 9C:
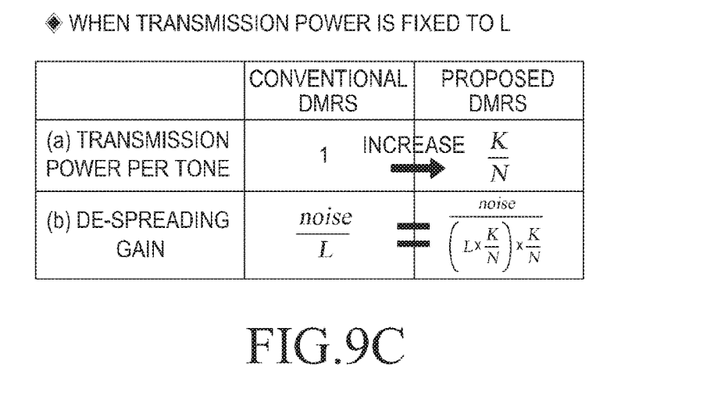

Further, in an example of FIGS. 9A, 9B and 9C, the MSE generated when the channel estimation is performed using the DMRS generated by the conventional art is compared with the MSE generated when the channel estimation is performed using the expanded DMRS having the sparse code structure according to the embodiment of the present disclosure in the case of K=4, N=2, and J=6 in the SCMA-based communication system.

FIGS. 9A, 9B, 9C and 10 illustrate an example of a comparison between results of channel estimation using the DMRSs generated in the conventional art and the embodiment of the present disclosure.

Referring to FIGS. 9A and 9B, through a comparison between the non-zero element included in the DMRS generated by the conventional art and the non-zero element included in the expanded DMRS generated by the embodiment of the present disclosure, it can be noted that the number of non-zero elements included in the expanded DMRSs generated according to the embodiment of the present disclosure decreases compared to the number of non-zero elements included in the DMRS generated by the conventional art. As described above, it can be noted that tone-specific transmission power increases according to the decrease in the number of non-zero elements included in the expanded DMRS generated according to the embodiment of the present disclosure compared to that of the conventional art. When transmission power per tone in the DMRS having the length L generated by the conventional art is 1, the number L of all REs can be total transmission power. In contrast, when transmission power per tone in the expanded DMRS generated according to the embodiment of the present disclosure is 1, total transmission power can be the number of REs. Accordingly, if the transmission power is equally fixed to L in the expanded DMRS generated according to the embodiment of the present disclosure and the DMRS generated by the conventional art for the same comparison, it can be noted that the transmission power per tone increases K/N times as illustrated in FIG. 9C.

Figure 10:
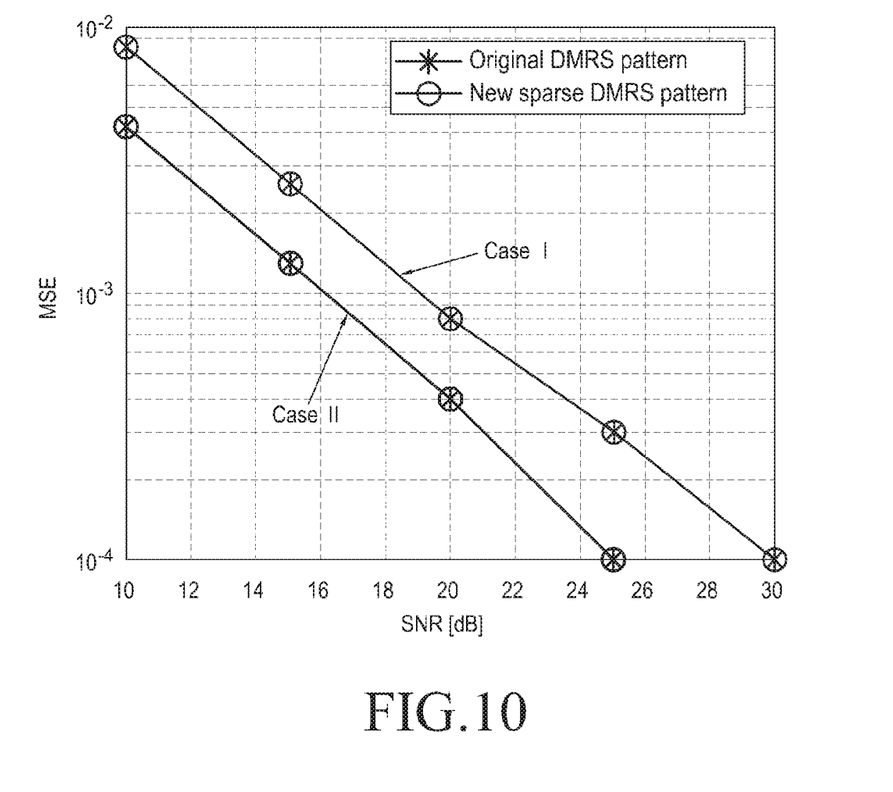

In FIG. 10, a received signal timing aligned in the eNB is assumed. A channel is a Rayleigh block fading channel, the channel is constant during one RB, that is, 12 tones in case I, and the channel is constant during two RBs in case II. A channel estimation method includes a de-spreading method. Under such a condition, it can be noted that an MSE performance of the channel estimation using the expanded DMRS generated according to the embodiment of the present disclosure is the same as that of the channel estimation using the DMRS generated by the conventional art as illustrated in FIG. 10. It can be noted that a de-spreading gain finally becomes the same as the transmission power per tone in the expanded DMRS having the sparse code structure generated according to the embodiment of the present disclosure increases but non-zero elements decrease.

Figure 11A:
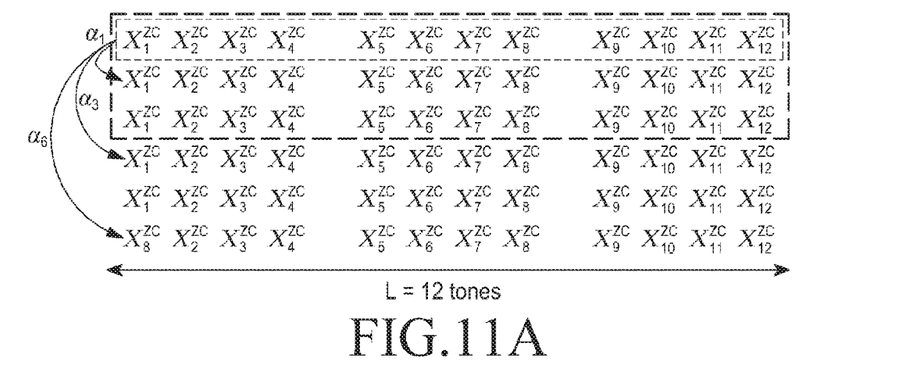
FIGS. 11A and 11B illustrate an example of a structure of DMRSs generated according to the embodiment of the present disclosure and a structure of DMRSs generated according to the conventional art.
Figure 11B:
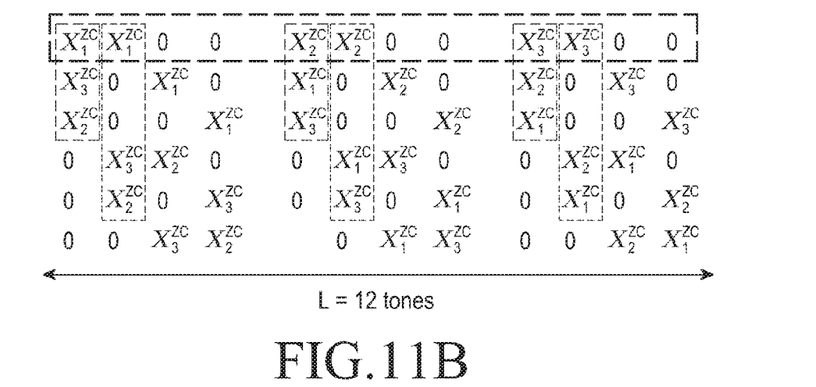

FIGS. 11A and 11B illustrate an example of a structure of the DMRS generated according to the embodiment of the present disclosure and a structure of the DMRS generated by the conventional art, wherein it is assumed that parameters K=4, N=2, and J=6, and the number of active UEs is 3.

As illustrated in FIGS. 11A and 11B, when the number of active UEs is small, interference is reduced by the increased transmission power per tone and the sparse code structure and, accordingly, more accurate tone-specific channel estimation can be performed in a frequency selective fading channel compared to the conventional art.

Figure 12:
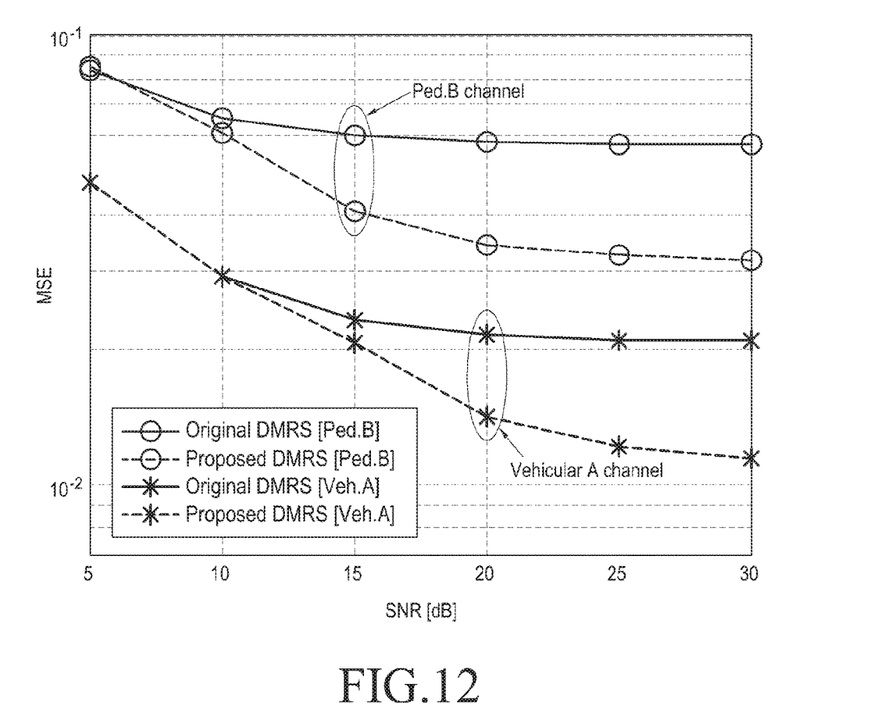
FIG. 12 illustrates an example of a comparison between channel estimation results using the DMRSs generated according to the conventional art and the embodiment of the present disclosure based on a channel environment.

FIG. 12 illustrates an example of a comparison between results of channel estimation using the DMRSs generated according to the conventional art and the embodiment of the present disclosure based on a channel environment.

Referring to FIG. 12, MSE performances of the channel estimation using the DMRSs generated according to the conventional art and the embodiment of the present disclosure are compared for a pedestrian (Ped) channel and a vehicular channel. Further, while the channel estimation is performed using the DMRSs generated by the conventional art through the de-spreading method, the channel estimation is performed using the de-spreading method for tones having interference due to the sparse code structure and a fine tuning method corresponding to an LS method for tones having no interference in the DMRSs generated according to the embodiment of the present disclosure. As illustrated in FIG. 12, it can be noted that the channel estimation using the DMRS generated according to the embodiment of the present disclosure has a considerable performance gain of the MSE compared to the channel estimation using the conventional art.

Accordingly, when the channel estimation is performed using the expanded DMRS having the sparse code structure generated according to the embodiment of the present disclosure in the frequency selective fading channel as well as a frequency flat fading channel in the SCMA-based communication system, effective tone-specific channel estimation is expected.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of transmitting a reference signal in a communication system, the method comprising:
   transmitting the reference signal generated using a transmission matrix,
   wherein the transmission matrix is generated by repeating a basis matrix including zero elements and non-zero elements by a predetermined number of times and a basis sequence is allocated to the non-zero elements included in the transmission matrix, and
   wherein one of a plurality of elements included in the basis sequence is allocated to each of non-zero elements included in a first column in the transmission matrix, an element cyclic shifted from one element included in the basis sequence is allocated to each of non-zero elements included in a second column in the transmission matrix having a predetermined column interval spacing from the first column.

2. The method of claim 1, wherein the basis matrix is generated based on a code length used for the communication system, a number of non-zero symbols, a maximum number of accessible User Equipments (UEs) in the communication system, a number of elements included in rows of the basis matrix corresponds to the code length, and a number of elements included in columns of the basis matrix corresponds to the maximum number of accessible UEs.

3. The method of claim 2, wherein the predetermined number is determined to be larger than or equal to a value generated by dividing a value, which is generated by multiplying the number of non-zero symbols and the maximum number of accessible UEs, by the code length, and the number of columns of the transmission matrix corresponds to a value generated by multiplying the code length and the predetermined number.

4. The method of claim 1, wherein the predetermined number is determined to be larger than or equal to a number of non-zero elements included in columns of the basis matrix.

5. The method of claim 1, wherein the basis sequence is a Zadoff-Chu (ZC) sequence of a baseband, and the ZC sequence has a length identical to the predetermined number.

6. A method of receiving a reference signal in a communication system, the method comprising:
   receiving the reference signal generated using a transmission matrix,
   wherein the transmission matrix is generated by repeating a basis matrix including zero elements and non-zero elements by a predetermined number of times and a basis sequence is allocated to the non-zero elements included in the transmission matrix, and
   wherein one of a plurality of elements included in the basis sequence is allocated to each of non-zero elements included in a first column in the transmission matrix, an element cyclic shifted from one element included in the basis sequence is allocated to each of non-zero elements included in a second column in the transmission matrix having a predetermined column interval spacing from the first column.

7. The method of claim 6, wherein the basis matrix is generated based on a code length used for the communication system, a number of non-zero symbols, a maximum number of accessible User Equipments (UEs) in the communication system, a number of elements included in rows of the basis matrix corresponds to the code length, and a number of elements included in columns of the basis matrix corresponds to the maximum number of accessible UEs.

8. The method of claim 7, wherein the predetermined number is determined to be larger than or equal to a value generated by dividing a value, which is generated by multiplying the number of non-zero symbols and the maximum number of accessible UEs, by the code length, and the number of columns of the transmission matrix corresponds to a value generated by multiplying the code length and the predetermined number.

9. The method of claim 6, wherein the predetermined number is determined to be larger than or equal to a number of non-zero elements included in columns of the basis matrix.

10. The method of claim 6, wherein the basis sequence is a Zadoff-Chu (ZC) sequence of a baseband, and the ZC sequence has a length identical to the predetermined number.

11. An apparatus for transmitting a reference signal in a communication system, the apparatus comprising:
    at least one processor configured to make a control to transmit the reference signal generated using a transmission matrix and to transmit the reference signal,
    wherein the transmission matrix is generated by repeating a basis matrix including zero elements and non-zero elements by a predetermined number of times and a basis sequence is allocated to the non-zero elements included in the transmission matrix, and
    wherein one of a plurality of elements included in the basis sequence is allocated to each of non-zero elements included in a first column in the transmission matrix, an element cyclic shifted from one element included in the basis sequence is allocated to each of non-zero elements included in a second column in the transmission matrix having a predetermined column interval spacing from the first column.

12. The apparatus of claim 11, wherein the basis matrix is generated based on a code length used for the communication system, a number of non-zero symbols, a maximum number of accessible User Equipments (UEs) in the communication system, a number of elements included in rows of the basis matrix corresponds to the code length, and a number of elements included in columns of the basis matrix corresponds to the maximum number of accessible UEs.

13. The apparatus of claim 12, wherein the predetermined number is determined to be larger than or equal to a value generated by dividing a value, which is generated by multiplying the number of non-zero symbols and the maximum number of accessible UEs, by the code length, and the number of columns of the transmission matrix corresponds to a value generated by multiplying the code length and the predetermined number.

14. The apparatus of claim 11, wherein the predetermined number is determined to be larger than or equal to a number of non-zero elements included in columns of the basis matrix.

15. The apparatus of claim 11, wherein the basis sequence is a Zadoff-Chu (ZC) sequence of a baseband, and the ZC sequence has a length identical to the predetermined number.

16. An apparatus for receiving a reference signal in a communication system, the apparatus comprising:
- at least one processor configured to make a control to receive the reference signal geneated using a transmission matrix and to receive the reference signal,
- wherein the transmission matrix is generated by repeating basis matrix including zero elements and non-zero elements by a predetermined number of times and a basis sequence is allocated to the non-zero elements included in the transmission matrix, and
- wherein one of a plurality of elements included in the basis sequence is allocated to each of non-zero elements included in a first column in the transmission matrix, an element cyclic shifted from one element included in the basis sequence is allocated to each of non-zero elements included in a second column in the transmission matrix having a predetermined column interval spacing from the first column.

17. The apparatus of claim 16, wherein the basis matrix is generated based on a code length used for the communication system, a number of non-zero symbols, a maximum number of accessible User Equipments (UEs) in the communication system, a number of elements included in rows of the basis matrix corresponds to the code length, and a number of elements included in columns of the basis matrix corresponds to the maximum number of accessible UEs.

18. The apparatus of claim 17, wherein the predetermined number is determined to be larger than or equal to a value generated by dividing a value, which is generated by multiplying the number of non-zero symbols and the maximum number of accessible UEs, by the code length, and the number of columns of the transmission matrix corresponds to a value generated by multiplying the code length and the predetermined number.

19. The apparatus of claim 16, wherein the predetermined number is determined to be larger than or equal to a number of the non-zero elements included in columns of the basis matrix.

20. The apparatus of claim 16, wherein the basis sequence is a Zadoff-Chu (ZC) sequence of a baseband, and the ZC sequence has a length identical to the predetermined number.

* * * * *